Figure 1:
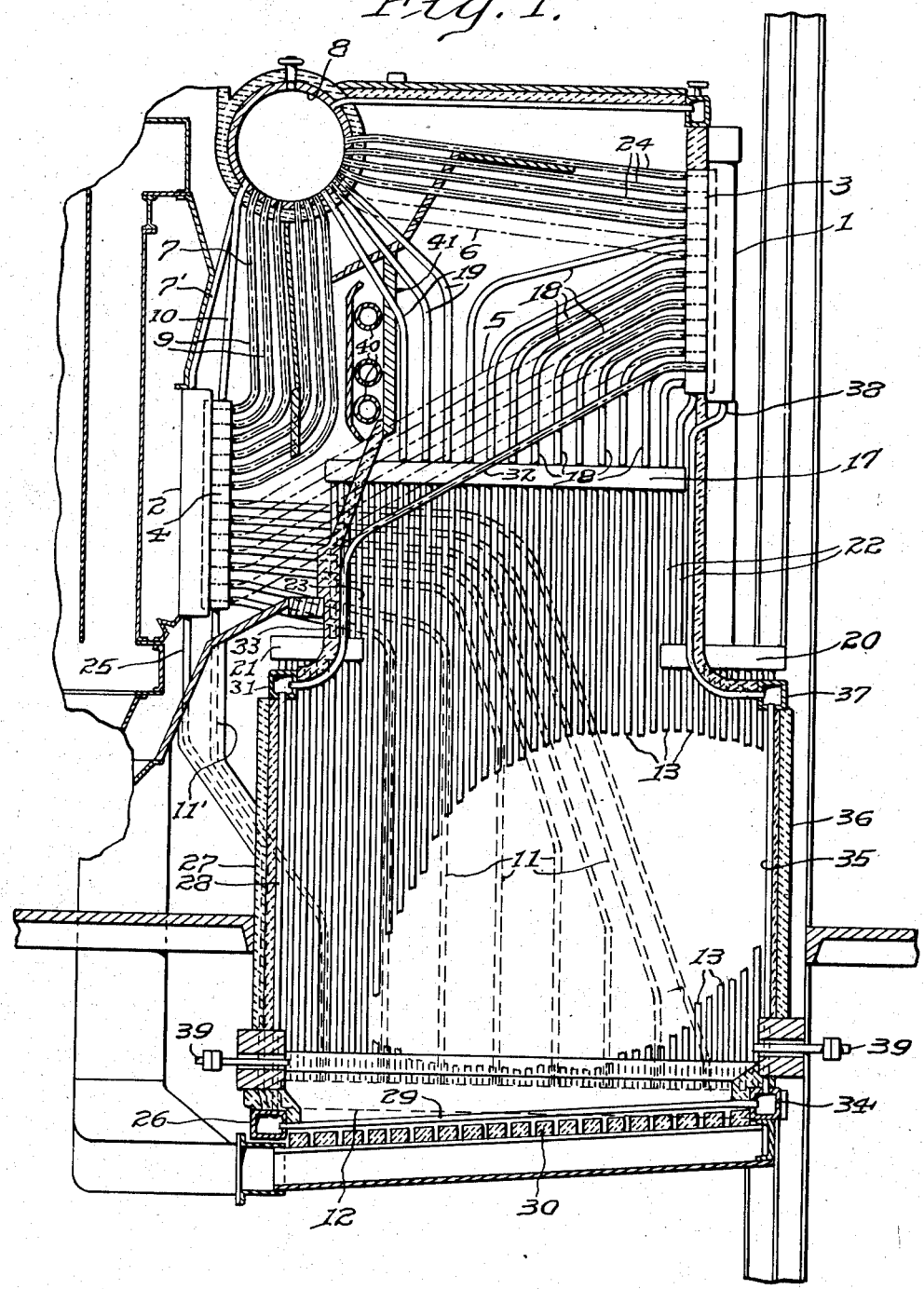

April 3, 1934.   P. BADENHAUSEN   1,953,149
WATER COOLED WALL FOR BOILERS
Filed July 20, 1931   2 Sheets-Sheet 1

INVENTOR
Phillips Badenhausen,
BY *Alston B. Moulton*
ATTORNEY

WITNESS
F. J. Hartman.

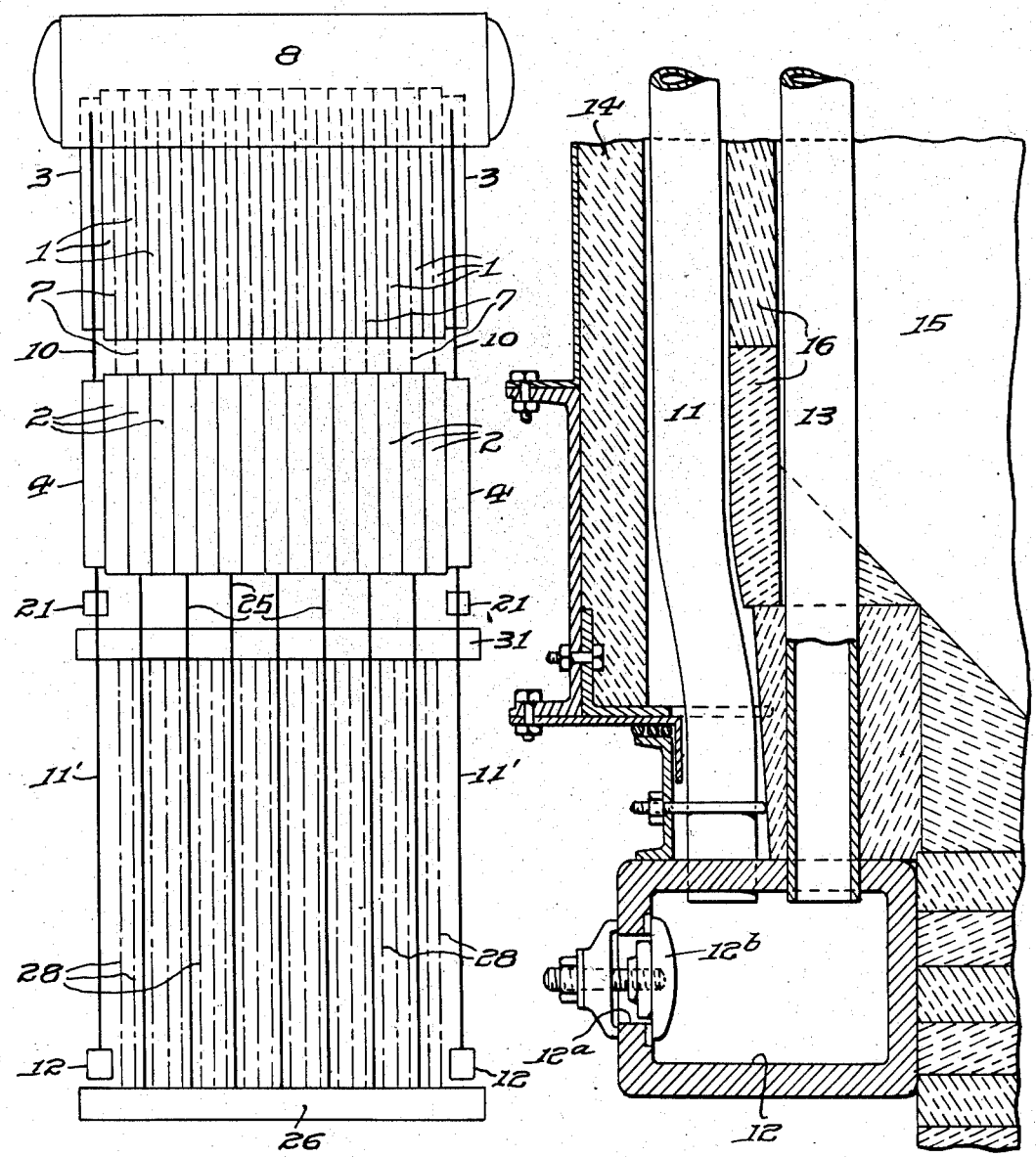

Patented Apr. 3, 1934

1,953,149

UNITED STATES PATENT OFFICE 1,953,149

WATER COOLED WALL FOR BOILERS

Phillips Badenhausen, Philadelphia, Pa., assignor to Badenhausen Corporation, Cornwells Heights, Pa., a corporation of Pennsylvania Application July 20, 1931, Serial No. 551,849

7 Claims. (Cl. 122—235)

My invention relates to boiler constructions wherein the walls of the combustion chamber are cooled by the circulation therethrough or thereover of water taken from a steam-generating-section of the convection type and more particularly to the providing of the walls of a header type boiler with cooling water in such a manner that the supply of water to the circulatory system is maintained even though the level of the water within the steam-generating-section is below the steam and water drum and said drum is filled only with steam.

Heretofore in boilers of the header type it has been attempted to cool the walls of a boiler by water supplied thereto from the steam-and-water drum; that is to say, from the drum into which the generated steam is collected, and from which the steam is conveyed away for useful purposes.

Since, however, the conversion of a relatively small amount of water into steam substantially lowers the water level of the boiler, it is not unusual to find the water line below the outlet from the steam-and-water drum into the water-cooling system, with the result that no more water flows into the circulatory cooling system and the water in the walls is quickly converted into steam.

Since these water cooled walls are generally necessary in a boiler in which liquid fuel or pulverized fuel or solid fuels are used because the temperatures in the furnaces of such boilers is very high, the failure to maintain a circulation of water in the water cooled walls creates serious loss and danger, for the high heat of combustion in the combustion chamber causes the uncooled walls to rapidly wear down and become substantially weakened.

It is one of the objects of the present invention to provide a construction wherein the delivery of water to the walls of the furnace is absolutely insured so long as there is any water in the steam-generating section of the boiler.

It is a further object of the present invention to supply water of the circulatory system to water cooled walls in such a manner that "solid" water (as distinguished from a mixture of steam-and-water) is delivered from the downcomers to the lower manifolds and from said manifolds to the lower ends of the riser tubes that cool a given wall, thereby insuring an even and certain or positive circulation of water in the walls from the lower manifolds upwardly; for the absorption of heat by the water in the riser cooling tubes changes the water in the risers to a mixture of water and steam, making the contents of the risers lighter than "solid" water with a resultant certain and positive upward movement of the water in the risers.

This is of particular importance in high service boilers having deep combustion chambers for when the water from the boiler is supplied at one point only to a lower manifold to which the lower ends of the riser cooling tubes are connected, as is the usual practice, the water may absorb a considerable amount of heat in traveling through the lower manifold before it reaches a remote riser, with the result that some of the steam generated in the lower manifold may rise in the downcomer tubes by which water should be supplied to the manifold, thereby interfering with or opposing a good circulation of water in the wall tubes or risers.

It is an object of this invention to remedy that condition and in this respect the present invention is in the nature of an improvement on the cooling system of my Letters Patent of the United States No. 1,747,612, granted February 18, 1930.

Other objects of my invention will appear in the specification and claims below.

In the drawings forming a part of this specification and in which the same reference characters are employed throughout the various views to designate the same parts, Fig. 1 is a vertical cross-sectional view through a boiler of the header type from the front to the rear thereof.

Fig. 2 is a diagrammatic view of the connections to the rear series of unit headers for the water-cooling system and the location of the main headers or manifolds with respect thereto and to each other; and Fig. 3 is a vertical cross-sectional view on a larger scale through the lower end of one of the water cooled walls showing a header to which the water from the boiler is delivered and whence the water flows upwardly through the riser tubes on the inside of the combustion chamber, where they are exposed to the radiant heat of the burning fuel.

In the drawings, for the sake of visually distinguishing between the headers 1—2 of the steam-generating section and the headers 3—4 of the cooling system, the headers 3—4 of the water-cooling system are illustrated as slightly smaller than those of the steam-generating system and as set back slightly into the boiler from the plane of the headers 1—2 of the steam-generating section. In actual practice the headers 3—4 for the water circulatory system will be preferably similar to the headers 1—2 of the steam-generating section, will be preferably in alinement therewith and will be preferably in the same plane. In fact, my invention contemplates the possible utilization of the two unit headers at the ends of a series of boiler unit headers as the headers of the water-cooling and circulatory system for the side walls of the boiler.

In Fig. 1, the banks of tubes of the steam-generating section proper are merely indicated by dot-and-dash lines to avoid confusion with the tubes of the water-circulatory system for cooling the walls. It is sufficient to state, so far as the steam-generating section goes, the lower portion of each unit header 1 of the upper series of headers is connected by a bank of water tubes 5 to the lower portion of a corresponding unit header 2 of the lower series; the upper portions of each unit header 1 and 2 of both the upper and lower series are connected respectively by banks of water tubes 6 and 7 with the steam-and-water cross-drum 8 extending transversely of the boiler and located at a somewhat higher level than that of the upper series of unit steam-generating headers 1. The course of the circulation of the water in the steam-generating section of such a boiler is from the lower series of headers 2 through the bank of tubes 5 upwardly into the upper series of headers 1, thence upwardly and backwardly through the bank of tubes 6 to the cross-drum 8 and then downwardly through the tubes 7 to the lower series of unit headers 2.

With a cross-drum or steam-and-water drum 8 of relatively small capacity, the level of the water in the steam-generating section may easily be below the point where the drum is tapped for supplying water to a water circulatory system used in cooling the walls of the furnace or boiler. It is usually attached to the drum 8 either to the rear of or in front of the bank of tubes 7 and is therefore well above the lowest portion of the drum 8.

When, therefore, the level of the water in the drum 8 is below that point no water is delivered to the water-cooling system and the water then in the walls of the cooling system is quickly converted into steam, leaving no water whatever in the cooling system. It is one of the objects of the present invention to provide an arrangement whereby this condition cannot arise.

I will first describe the water circulatory system for cooling the side walls. From the cross-drum 8 a bank of water tubes 9 connect with the upper part or half of the headers 4 located respectively at the ends of the series of lower steam-generating headers 2 (see Fig. 2). In order that the circulation of water through the header may be complete, a supplemental tube 10 connects the cross-drum 8 to the upper end of the header 4. The point where this tube 10 enters the cross-drum 8 is the point where the supply tube for a wall water cooling system has usually been connected in this type of boiler.

A bank of water tubes 11 connect the lower part of the end headers 4 respectively to the lower side wall manifolds 12 at points, generally speaking, equally spaced from each other on the top side of the manifold throughout the length thereof. Each bank of tubes 11 is supplemented by a tube 11' tapped into the lower end of the corresponding header 4 and forming the rearmost connection of the header 4 with the top of the manifold 12.

From the manifold 12 a series of closely set riser tubes 13 substantially line or form the inner sides of the side walls of the boiler. They are exposed to the radiant heat of combustion within the boiler.

In Fig. 3 the manifold or header 12 and the manner of attaching the tubes 11 and 13 thereto is clearly illustrated. The downcomer tubes 11 are preferably within the side walls 14 of the boiler, but are protected from the radiant heat of the combustion chamber 15 by a wall of blocks of refractory material 16 interposed between the tubes 11 and 13, whereby to insure the maintenance of solid water in the tubes 11 rather than a steam and water mixture as in the tubes 13, and a circulation of water downwardly through the downcomer tubes 11 into the header 12 and thence upwardly through the risers or cooling tubes 13.

The headers 12 are preferably of heavy construction and are provided at intervals with handholes 12$^a$ and closures 12$^b$ therefor to give access to the interior thereof for cleaning.

The upper ends of the bank of riser tubes 13 are connected in the main to an upper side wall manifold 17 which in turn is connected by a bank of tubes 18 with the front upper header 3 of the water circulatory system and by a bank of tubes 19 with the cross-drum 8.

Where, as is illustrated in Fig. 1, the lower part of the combustion chamber 15 is longer or deeper than the upper part, the foremost and rearmost of the riser tubes 13 may connect at their upper ends with supplemental headers or manifolds 20 and 21 respectively from which one or more riser tubes 22 and 23 communicate with the main upper side wall manifold 17.

From the upper headers 3 of the water-circulatory system, the water passes by a bank of tubes 24 to the cross-drum 8. Heretofore it has been common to use a downcomer pipe from the cross-drum 8 to the lower manifold 12, but it has been a single pipe or several pipes connected to one end of the manifold. It has also been common in water-tube boilers other than those of the header type, to connect a lower drum corresponding in position to that of the headers 2 and 4 to the lower manifold by a single pipe or several pipes. But in such constructions, especially in deep combustion chamber boilers, the water in the manifold absorbs a considerable amount of heat in traversing the header from the point of the intake to the riser tubes on the upper side thereof so that the water in the lower manifold is partly converted into steam which may tend to rise to the surface of the water in the boiler through the downcomer tubes, an operation which will greatly interfere with the free and rapid circulation of water of the water cooling system upwardly through the risers. Moreover, when the water from the boiler is supplied to a lower manifold, at a single point, the remote end of the manifold may not receive sufficient water to feed the cooling tubes which would greatly endanger these cooling tubes at the said remote end.

By the present construction this difficulty is avoided for by delivering the water directly to the manifold at a relatively large number of places substantially equally spaced throughout the length of the manifold, each downcomer 11 virtually supplies water to only two or three riser tubes 13 on each side thereof and the travel in the manifold is so short that said water is equally distributed to the riser tubes 13 as "solid" water. As the water travels upwardly in the risers 13, it continually absorbs heat and a part thereof is changed to steam, so that the risers 13 contain a mixture of steam and water which is lighter than the "solid" water in the downcomers and lower manifolds, and, therefore produces a positive circulation of water through the circulatory system of the wall cooling system.

From the upper manifold 17 of the side walls, part of the water is returned by the bank 18 to the front headers 3 and part of the water is returned directly to the cross-drum 8 by the bank of tubes 19. The water entering the headers 3 rises and traversing the bank of tubes 24 is delivered back to the steam-and-water drum 8.

When only the side walls of the furnace are to be cooled the above constitutes my preferred way of so doing, but the invention is not limited to the mere cooling of the side walls. I have applied the same principle to the front and rear walls and to the water cooling of the bottom wall of the furnace utilizing the steam-generating section of the boiler for the purpose.

To every steam generating unit-header 2 or to every second or third or more of said unit-headers is attached a downcomer tube 25 which is also attached to the upper side of a lower rear manifold 26 shown in Fig. 1 and located at the bottom of the rear wall 27 of the furnace. From this manifold 26 extend upwardly a series of riser tubes 28 substantially covering the interior surface of the rear walls 27 and exposed to the radiant heat of the combustion chamber.

The connection of the downcomer pipes 25 and the risers 28 with the manifold 26 is like that shown in Fig. 3 except that from the manifold 26 extend a series of bottom water tubes 29 covering the bottom wall 30 of the furnace or combustion chamber. In general practice, I do not find it necessary to connect every header of the series of steam-generating headers 2 with the manifold 26. In Fig. 2 I have shown such downcomers 25 connected to the bottoms of every other header 2 of the steam-generating section. They might be attached to every header or to every third or fourth or more, depending upon the size of the boiler and the temperature in the combustion chamber, but each downcomer 25 will be required to supply water to but the few risers 28 that are close thereto so that the water does not traverse any considerable length of the rear header 26 before entering a riser tube 28.

When the combustion chamber is less deep at the top than it is at the bottom, I may, and preferably provide an intermediate manifold 31 at the top of the riser pipes 28 and communicating therewith, and then from said manifold 31 I may provide further riser tubes 32 fairly covering a substantial part of the inset rear wall 33 and then running forwardly and communicating with the lower ends of every upper header 1, or to every second, or third, or fourth of the upper headers 1 of the steam-generating section of the boiler. The forward ends of the bottom water tubes also communicate with a manifold 34 at the front of the furnace from which extend a series of vertical risers 35 substantially covering the inner surfaces of the front wall 36 and having their upper ends attached to a manifold 37 intermediate of the furnace height and from thence I arrange a less closely set series of riser pipes 38 which communicate with the lower ends of certain of the steam-generating unit headers 1. By this arrangement the water in the steam-generating lower headers 2 is conveyed by the downcomers 25 to the manifold 26 whence part of it rises through the risers 28 to cool the rear wall and from the upper manifold 31 through the risers 32 to cool the upper inset rear wall and thence to the upper headers 1 of the steam-generating section. From the headers 1 the water passes rearwardly through the upper bank of tubes 6 to the cross-drum 8 and through the bank of steam-generating tubes 7 and the supplemental tube 7' to the rear headers 2 of the steam-generating section.

In this system then I have arranged to insure the delivery of the cooling water from the headers 2 to the main rear lower header 26 in such a manner that solid water flows therethrough into the risers 28 and into the bottom water tubes 29 and by supplying the header 34 with water as it comes from a plurality of pipes 29 spaced from each other throughout the length of the header 34, the water is not required to travel any substantial distance longitudinally of the header 34 but rises immediately therefrom through the risers 35.

With this arrangement of a plurality of front riser pipes or tubes 35 discharging into the manifold 37 and of the manifold 37 discharging into the upper riser pipes 38, the water does not travel any substantial length in the manifold 37 and consequently the water therefrom entering the risers 38 is equally distributed.

I have indicated but two burners 39 through which liquid or pulverized fuel is discharged for combustion within the combustion chamber 15, but they may be of any type or design and may be located at any desired point or points and may be as numerous as may be required for a particular construction. For that matter any type of fueling may be employed. The usual superheater drums 40 are shown, but the superheater tubes, leading therefrom and passing through the baffle 41 into the combustion chamber over the plane of the upper manifold 17 are omitted in the interest of clearness.

While I have described the riser tubes for protecting the walls of the furnace as being exposed or bared to the radiant heat of the furnace, it is to be understood that in certain types of boiler construction, riser tubes may be protected by a suitable lining or covering but whether they be so covered or not they are subject to the radiant heat of the furnace and are fully within the aim and scope of the present invention.

Having thus described my invention, what I claim and desire to protect by Letters Patent of the United States is:

1. In a boiler having a furnace or combustion chamber, the combination with a steam-generating section of the header type including a lower series of unit headers and an upper series of unit headers, of a side wall of said furnace and means for cooling said side wall, comprising a lower manifold, at the lower end of said side wall, an upper manifold at the upper end of said side wall, a series of closely spaced vertical riser tubes connecting said manifolds and subjected to the radiant heat of said furnace, a bank of downcomer tubes connecting the lower portion of the end unit header of the lower series of headers with said lower manifold and protected from the direct radiant heat of said furnace, and an upper series of risers extending upwardly from said upper manifold to the end unit header of the upper series of headers.

2. In a boiler having a furnace or combustion chamber, the combination with a steam-generating section of the header type including a lower series of unit headers and an upper series of unit headers, of a side wall of said furnace and means for cooling said side wall, comprising a lower manifold at the lower end of said side wall, an upper manifold at the upper end of said side wall, a series of closely spaced vertical riser tubes connecting said manifolds and subjected to the radiant heat of said furnace, a bank of downcomer tubes connecting the lower portion of the end unit header of the lower series of headers with said lower manifold at a plurality of points substantially equally spaced longitudinally of said manifold and protected from the direct radiant heat of said furnace, and an upper series of risers extending upwardly from said upper manifold to the end unit header of the upper series of headers.

3. In a boiler having a furnace or combustion chamber, the combination with a steam-generating section of the header type including a lower series of unit headers, an upper series of unit headers, and a cross-drum, of a furnace side wall, and means for cooling said side wall, comprising a lower manifold, at the lower end of said side wall, an upper manifold at the upper end of said side wall, a series of closely spaced vertical riser tubes connecting said manifolds and exposed to the radiant heat of said furnace, a bank of downcomer tubes connecting the lower portion of the end unit header of the lower series of headers with said lower manifold at a plurality of points substantially equally spaced longitudinally of said manifold and protected from the direct radiant heat of said furnace so that the water in the downcomer tubes is solid water and not a mixture of steam and water, and an upper series of risers extending upwardly from said upper manifold some of which are connected to the end unit header of the upper series of headers and others of which are directly connected with said cross-drum.

4. In a boiler of the header type having a furnace or combustion chamber, the combination with a steam-generating section including a lower series of unit headers and an upper series of unit headers, of a rear furnace wall and a water circulatory system for cooling said wall of said boiler, comprising a lower manifold at the lower end of said rear wall, an upper manifold at the upper end of said wall, a series of closely arranged vertical risers extending between said manifolds and exposed to the radiant heat of said furnace, a plurality of downcomer tubes substantially equally spaced from each other and connected to the lower ends of some of the headers of said lower series of headers and connected directly to said lower manifold at points substantially equally spaced from each other longitudinally of said manifold and protected from the radiant heat of said furnace, and a series of risers extending upwardly from said upper manifold and in communication with the circulatory water system of said steam-generating section of the boiler at a level higher than that of the connection of said downcomer tubes thereto.

5. In a boiler having a furnace or combustion chamber, the combination with a steam-generating section including a lower header, an upper header and steam-generating tubes connecting said headers, of a rear wall and a front wall for said furnace, and a water circulatory system for cooling said walls comprising a rear manifold at the lower end of said rear wall, downcomer tubes connecting said lower header with said lower rear manifold at a plurality of points substantially equally spaced from each other longitudinally of said rear manifold and protected from the radiant heat of said furnace, a front manifold at the lower end of said front wall, a plurality of tubes connecting said rear manifold with said front manifold at points substantially equally spaced longitudinally of said front manifold, an upper manifold at the upper end of said front wall, a series of closely arranged, vertical risers extending between said lower front manifold and said upper front manifold and exposed to the radiant heat of said furnace, a plurality of risers connecting said upper manifold with said upper header, an upper rear manifold at the upper end of said rear wall, a series of closely arranged, vertical risers extending between said lower rear manifold and said upper rear manifold and exposed to the radiant heat of said furnace, and a plurality of risers connecting said upper rear manifold with said upper header.

6. In a boiler having a furnace or combustion chamber, the combination with a steam-generating section of the header type including a lower header and an upper header, of a wall of said furnace and means for cooling said wall, comprising a manifold at the lower end of said wall, a series of substantially vertical tubes extending upwardly from the manifold and exposed to the radiant heat of combustion within said furnace, means connecting the upper ends of said vertical tubes with the upper header, a plurality of downcomer pipes located outside of the vertical tubes but within the wall and connecting the lower header with the manifold at points spaced longitudinally of the manifold, and refractory material located between the vertical tubes and the downcomer pipes to protect the downcomer pipes from the radiant heat of the furnace.

7. In a boiler having a furnace or combustion chamber, the combination with a steam-generating section of the header type including a lower header and an upper header, of a wall of said furnace and means for cooling said wall, comprising a lower manifold at the lower end of said wall, an upper manifold at the upper end of said wall, a series of substantially vertical tubes connecting said manifolds and exposed to the radiant heat of combustion within said furnace, a plurality of risers connecting said upper manifold with said upper header, a plurality of downcomer pipes located outside of the vertical tubes but within the wall and connecting the lower header with the lower manifold at points spaced longitudinally of the lower manifold, and refractory material located between the vertical tubes and the downcomer pipes to protect the downcomer pipes from the radiant heat of the furnace.

PHILLIPS BADENHAUSEN.